March 10, 1970  E. B. WAGNER  3,499,549
BEAM WELDMENT POSITIONER
Filed July 19, 1968  2 Sheets-Sheet 1

INVENTOR.
EDDIE B. WAGNER
BY
Attorney

March 10, 1970  E. B. WAGNER  3,499,549

BEAM WELDMENT POSITIONER

Filed July 19, 1968  2 Sheets-Sheet 2

INVENTOR.
EDDIE B. WAGNER
BY
*Lee N. Schermerhorn*
Attorney

United States Patent Office 3,499,549
Patented Mar. 10, 1970

3,499,549
BEAM WELDMENT POSITIONER
Eddie B. Wagner, 4436 NE. Maywood Place,
Portland, Oreg. 97220
Filed July 19, 1968, Ser. No. 746,042
Int. Cl. B65g 7/00
U.S. Cl. 214—1                                         5 Claims

ABSTRACT OF THE DISCLOSURE

A boom is mounted for raising and lowering, for tilting up or down and for rotation about an axis parallel to the boom. The boom is made as a flanged beam which is adapted for connection to a workpiece by bolting or by C-clamps. A second boom is provided for suspending welding equipment or other tools.

BACKGROUND OF THE INVENTION

This invention relates to apparatus for supporting a workpiece in different positions for welding and other work.

In welding work, and particularly in fabricating heavy assemblies and structures by welding, there has been long a need for a device to support the workpiece, raise and lower it, turn it over and tilt it. It has been common practice to use a conventional chain hoist for such purposes merely for lack of anything better. Maneuvering a workpiece with a chain hoist as the welding progresses is awkward and time consuming and it is not always possible to suspend the workpiece in a convenient position for the welder to work on it. Furthermore, the workpiece is not rigidly supported, since it is relatively free to sway and turn on its suspending chain.

SUMMARY OF THE INVENTION

The present apparatus provides a stable and rigid boom on which the workpiece may be secured by bolts or C-clamps. The apparatus includes means for raising, lowering, tilting and rotating the boom so that the workpiece may be moved to a wide variety of positions without changing its attachment to the boom. Thus, the workman can conveniently and quickly shift the position of the workpiece and turn it over from time to time to place it in the most convenient position for the work at hand. This saves a great deal of time and tends to improve the quality of the welds. The apparatus further includes a separate overhead boom for supporting welding equipment or other tools in a convenient position.

Objects of the invention are, therefore, to provide a beam weldment positioner, to provide improved apparatus for raising, lowering, tilting and rotating a workpiece, to provide apparatus of the type described which is easy and convenient to manipulate and adjust, to provide convenient means of support for a workpiece and to provide apparatus for the purpose described which is of relatively simple and inexpensive construction yet rugged and reliable in use.

The foregoing and other objects and advantages will become apparent and the invention will be better understood from the following description of the preferred embodiment illustrated in the accompanying drawings. Various changes may be made in the details of construction and arrangement of parts and certain features may be used without others.

DESCRIPTION OF THE PREFERRED EMBODIMENT

Figure 1:
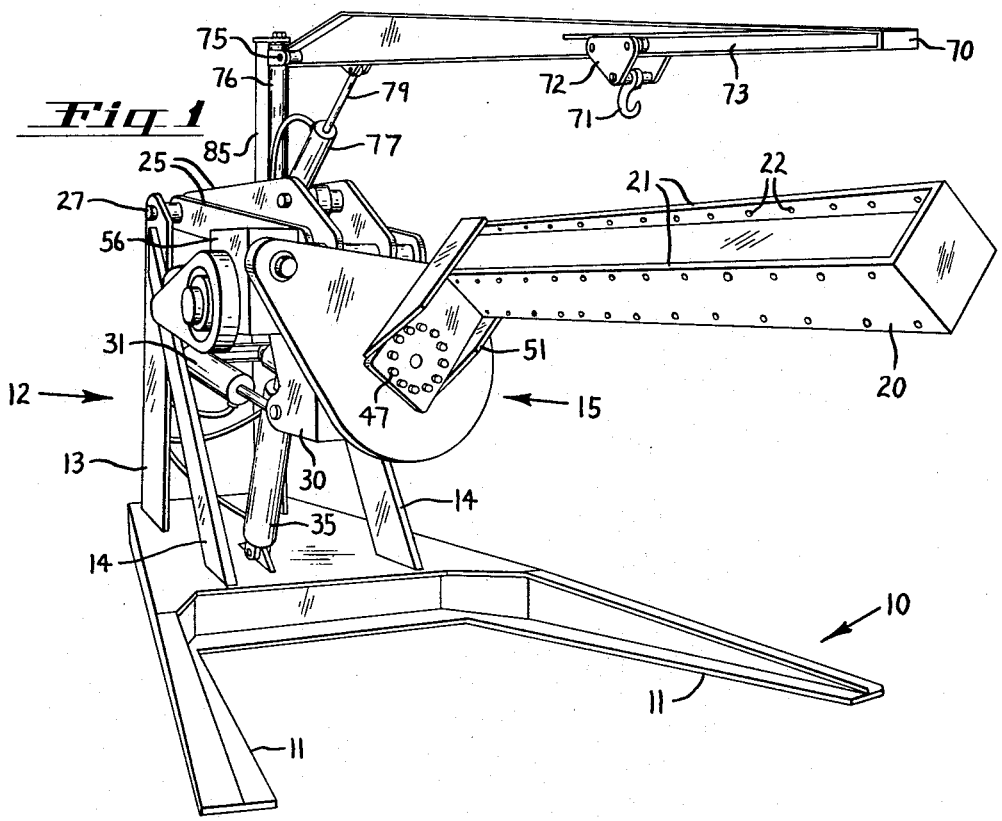
FIGURE 1 is a perspective view of a beam weldment postitioner embodying the principles of the invention.

The base 10 comprises a pair of divergent members 11 which provide a large open area of clear floor space between them. Mounted at the vertex of the V-shaped base is an upright support 12 comprising a pair of vertical members 13 and braces 14. Mounted on upright support 12 is a carriage assembly 15 and boom 20. Boom 20 overhangs the open space between base members 11 and is made as a beam with longitudinal flanges 21 having holes 22 whereby a workpiece may be securely mounted on the boom by means of bolts or C-clamps.

Figure 4:
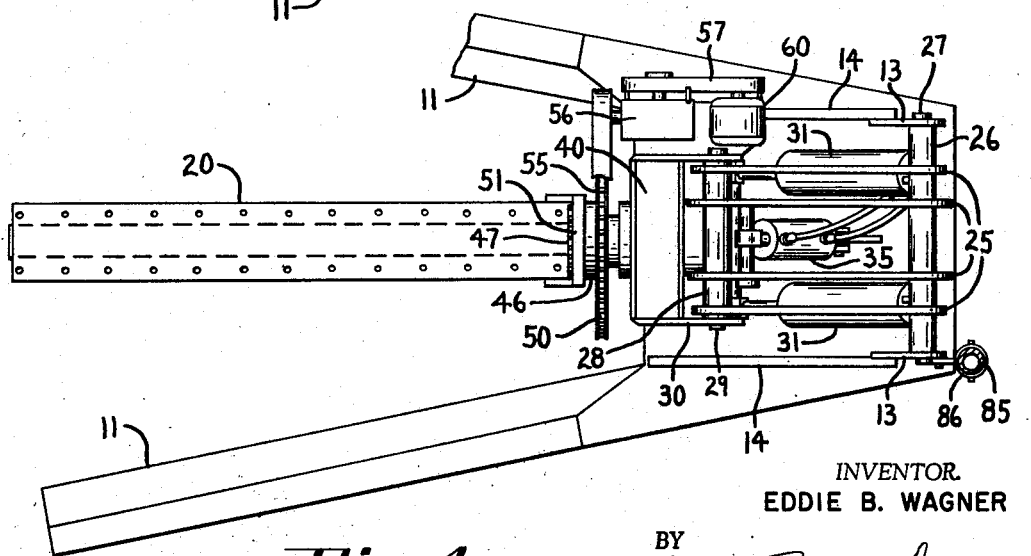
FIGURE 4 is a view on the line 4—4 in FIGURE 3.

Carriage assembly 15 is connected to upright support 12 by four parallel pivotal arms 25 in spaced apart side by side relation as shown in FIGURE 4. The rear ends of arms 25 are welded to a sleeve 26 which is mounted for rotation on a horizontal pin 27 in the upper ends of the upright members 13. The front ends of the arms 25 are welded to a sleeve 28 which is mounted for rotation on a pin 29. Pin 29 is carried by the upper ends of side plates 30 on carriage assembly 15.

A pair of cylinders 31 is pivotally mounted on a horizontal pin 32 in upright support 12. Their piston rods 33 are pivotally connected to a pin 34 mounted in the lower ends of plates 30. When piston rods 33 are partially extended from the cylinder 31, the cylinders are parallel with arms 25 and the distance between pins 32 and 34 is the same as the distance between pins 27 and 29. These parts thereby form a parallelogram linkage allowing carriage assembly 15 to be raised and lowered in parallel movement with the boom 20 horizontal. When piston rods 33 are retracted, carriage assembly 15 and boom 20 are tilted downward and when the piston rods are extended farther than shown in FIGURE 3, the carriage assembly and boom are tilted upward.

The boom is raised and lowered by a lift cylinder 35. The lower end of cylinder 35 is pivotally mounted on a pin 36 in the base 10 and its piston rod 37 is pivotally connected with a pin 38 in two of the arms 25. The piston rod is shown fully retracted in FIGURE 3, placing the arms 25 in the lowermost positions shown in full lines. When piston rod 37 is extended, the arms 25 are raised to the broken line position at 25a.

Figure 2:
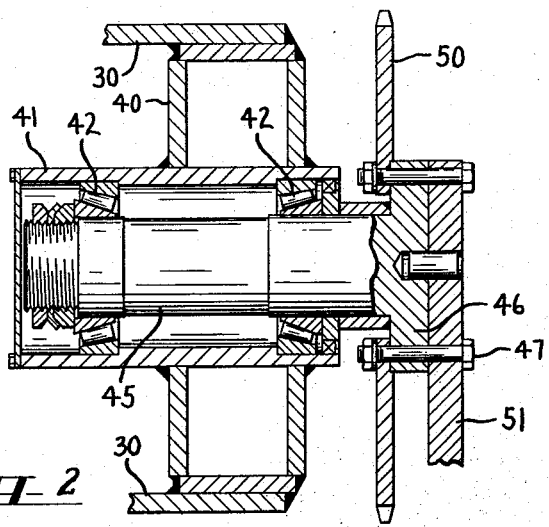
FIGURE 2 is an enlarged sectional view on the line 2—2 of FIGURE 3.

Carriage assembly 15 comprises a housing 40 welded between the side plates 30 as shown in FIGURE 2. Housing 40 carries a tube 41 having bearings 42 for a shaft 45. Shaft 45 has a flange 46 on its forward end provided with holes to receive the bolts 47. Bolts 47 mount a sprocket wheel 50 on the back side of the flange and an arm 51 on the front side of the flange. Arm 51 carries the beam 20 offset from and parallel with shaft 45 as shown in FIGURE 1.

Sprocket wheel 50 may be rotated by a chain 55 as shown in FIGURE 4. Chain 55 is driven by a reduction gear unit 56. This unit is driven by a belt or chain at 57 on a reversible motor 60. Reduction gear unit 56 and motor 60 are mounted on carriage assembly 15. This drive arrangement is capable of rotating arm 51 and boom 20 to an unlimited extent in either direction.

Figure 3:
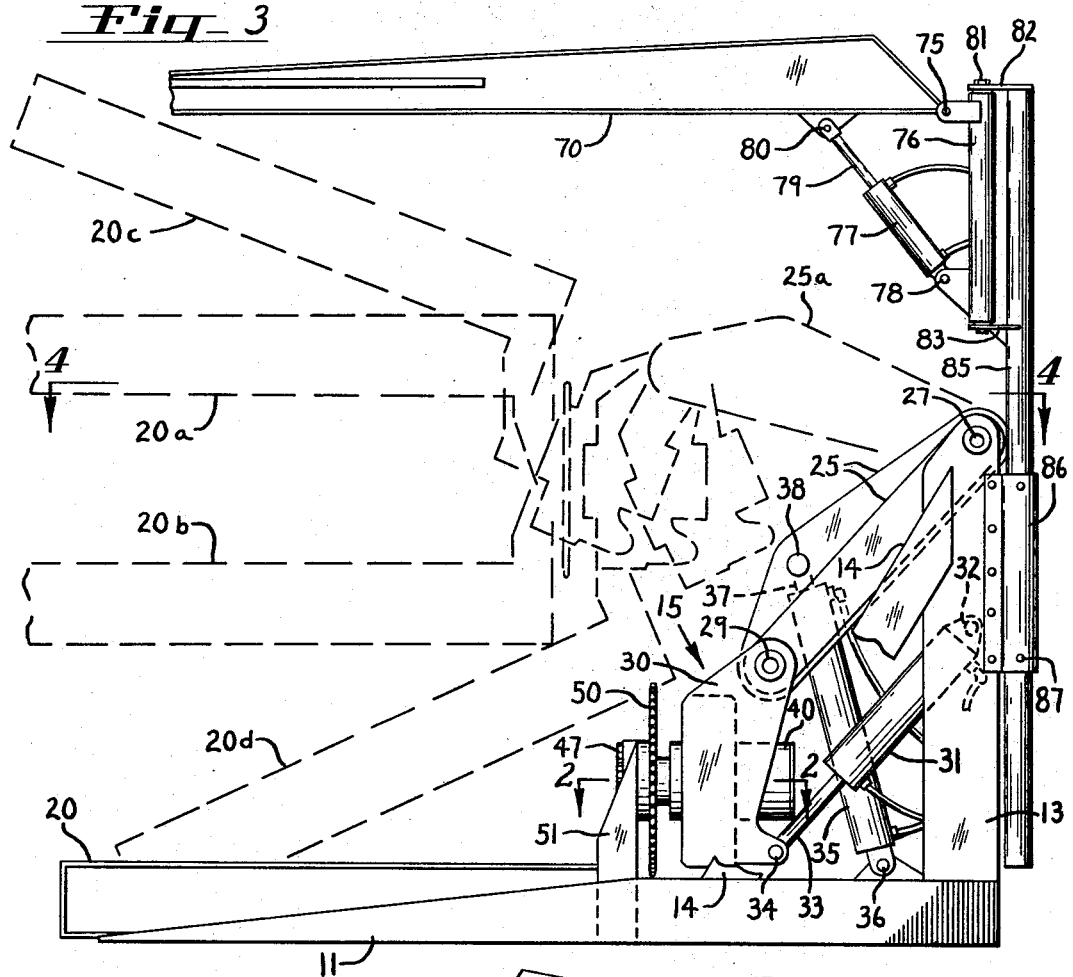
FIGURE 3 is a side elevation view of the apparatus, the boom being shown in a plurality of different positions in broken lines.

FIGURE 3 shows in broken lines different positions which the boom may assume. The boom may be rotated in horizontal position between an upper position 20a and a lower position 20b by motor 60 to turn the workpiece over. Arm 51 offsets the boom from its axis of rotation so that the center of gravity of the workpiece is approximately on the axis. By operation of cylinders 31, the boom may be tilted upward as indicated at 20c or tilted downward as indicated at 20d. By operation of lift cylinder 35, the boom may be lowered to rest flat on the floor between base members 11 as indicated in full lines at 20.

These different movements allow a workman to raise, lower, tilt and rotate a workpiece mounted on the boom 20. The different movements are independent of each other whereby the workpiece may be placed at any desired height above the floor while horizontal or tilted up or tilted down. This gives the workman a maximum of convenience in positioning a heavy or cumbersome workpiece to greatest advantage.

A welder's boom 70 is also provided to support welding equipment or tools above the workpiece. For this purpose, a hook 71 is mounted on a trolley 72 which is movable along a track 73 on the boom.

Boom 70 is pivotally mounted on a horizontal pin 75 carried by the upper end of vertical sleeve 76. The boom may be raised or lowered from horizontal position by a cylinder 77 which is pivotally mounted on a pin 78 on the lower end of sleeve 76. Piston rod 79 is pivotally connected to the boom at 80. Sleeve 76 is mounted for rotation of a vertical pin 81.

Pin 81 is carried by a pair of brackets 82 and 83 on a vertical post 85. Post 85 is adjustable vertically in a supporting tube 86 mounted on one of the upright members 13. Such height adjustment is provided by drilling holes in post 85 to receive pins or cap screws 87 in tube 86.

Thus, the supporting post 85 may be adjusted vertically in supporting tube 86, boom 70 may be tilted up or down on its pivot 75 and the boom may be swung laterally on its vertical supporting pin 81.

Having now described my invention and in what manner the same may be used, what I claim as new and desire to protect by Letters Patent is:

1. A workpiece positioner comprising a base having a pair of laterally spaced horizontal members adapted to rest on a floor and provide clear floor space between said members for the workpiece, an upright member on said base at one end of said pair of members, a carriage, arms pivotally connected at one end to said upright member and pivotally connected at their opposite ends to said carriage, tilt cylinder and piston units pivotally connected between said upright member and said carriage in vertically spaced relation with said arms forming a parallelogram linkage for the vertical movement of said carriage, extension and retraction of said cylinder and piston units tilting said carriage in a vertical plane between said base members, a lift cylinder and piston unit pivotally connected between said base and said arms for raising and lowering said carriage in said vertical plane, a shaft in said carriage rotatable on an axis in said vertical plane, a boom mounted on said shaft parallel with said shaft and extending over said clear floor space between said base members, and means on said boom for rigidly attaching a workpiece thereto, said boom being rotatable with said shaft, said boom being raised or lowered parallel with said vertical plane by said lift cylinder and piston unit, and said boom being tilted up or down from horizontal in movement parallel with said vertical plane by said tilt cylinder and piston units.

2. A positioner as defined in claim 1, said boom comprising a cantilever beam, and said attaching means comprising longitudinal flanges on said beam having bolt holes therein.

3. A positioner as defined in claim 1, said lift and tilt units being capable of placing said boom flat on the floor between said base members.

4. A positioner as defined in claim 1 including a second boom mounted for horizontal swinging movement above said first boom, and a trolley on said second boom.

5. A positioner as defined in claim 1 including a radial arm on said shaft, said boom being mounted on said arm in offset relation to said shaft, and a motor on said carriage for rotating said shaft.

References Cited

UNITED STATES PATENTS

| | | |
|---|---|---|
| 1,331,938 | 2/1920 | McConnell et al. |
| 1,875,761 | 9/1932 | Power _____ 269—71 XR |
| 2,468,326 | 4/1949 | Gleason. |
| 2,483,811 | 10/1949 | Cullen _____ 269—71 XR |
| 2,571,572 | 10/1951 | Harmon. |
| 3,059,785 | 10/1962 | Buckeye. |
| 3,219,215 | 11/1965 | Gunnlaugson _____ 214—147 |

FOREIGN PATENTS 1,085,993  8/1954  France.

ROBERT G. SHERIDAN, Primary Examiner

F. E. WERNER, Assistant Examiner

U.S. Cl. X.R.

214—147